(12) United States Patent
Pokrajac

(10) Patent No.: US 8,723,425 B2
(45) Date of Patent: May 13, 2014

(54) LIGHT EMITTING DIODE DRIVER CIRCUIT

(76) Inventor: Stevan Pokrajac, Windsor (CA)

( * ) Notice: Subject to any disclaimer, the term of this patent is extended or adjusted under 35 U.S.C. 154(b) by 88 days.

(21) Appl. No.: 13/525,703

(22) Filed: Jun. 18, 2012

(65) Prior Publication Data
US 2012/0319587 A1 Dec. 20, 2012

Related U.S. Application Data

(60) Provisional application No. 61/498,027, filed on Jun. 17, 2011.

(51) Int. Cl.
  *H05B 37/02* (2006.01)
(52) U.S. Cl.
  USPC .......................................... 315/122; 315/291
(58) Field of Classification Search
  None
  See application file for complete search history.

(56) References Cited

U.S. PATENT DOCUMENTS

| | | | |
|---|---|---|---|
| 6,400,101 B1 | 6/2002 | Biebl et al. | |
| 6,856,098 B2* | 2/2005 | Piaskowski | 315/224 |
| 6,963,175 B2* | 11/2005 | Archenhold et al. | 315/291 |
| 7,898,187 B1 | 3/2011 | Mei et al. | |
| 7,902,769 B2* | 3/2011 | Shteynberg et al. | 315/291 |
| 7,906,917 B2* | 3/2011 | Tripathi et al. | 315/291 |
| 8,427,069 B2* | 4/2013 | Wibben | 315/291 |
| 2002/0171467 A1 | 11/2002 | Worley, Sr. et al. | |
| 2004/0036418 A1 | 2/2004 | Rooke et al. | |
| 2005/0001562 A1 | 1/2005 | Pederson | |
| 2005/0218838 A1* | 10/2005 | Lys | 315/291 |
| 2006/0072324 A1 | 4/2006 | Hachiya et al. | |
| 2006/0082529 A1 | 4/2006 | Oyama | |
| 2006/0086888 A1 | 4/2006 | Eash | |
| 2006/0170373 A1 | 8/2006 | Yang | |
| 2006/0192728 A1 | 8/2006 | Kim | |
| 2006/0214603 A1 | 9/2006 | Oh et al. | |
| 2007/0013323 A1 | 1/2007 | De Oto | |
| 2007/0097043 A1 | 5/2007 | Yang | |
| 2007/0182338 A1* | 8/2007 | Shteynberg et al. | 315/200 R |
| 2007/0210726 A1 | 9/2007 | Illegems | |
| 2008/0012501 A1 | 1/2008 | Grajcar | |
| 2008/0079367 A1 | 4/2008 | Sah | |

(Continued)

FOREIGN PATENT DOCUMENTS

| | | |
|---|---|---|
| CA | 2643883 | 11/2008 |
| CN | 201368366 | 12/2009 |

(Continued)

*Primary Examiner* — Crystal L Hammond

(57) ABSTRACT

The present teachings provide a device and method of regulating current flow across an array of emitting diodes (LEDs) for the purpose of illumination. The device has a power supply (vext) connected to an LED array. The LED array is connected to a current foldback element, a current limitation element, a current sensing element, and a current switch. Current through the array of light emitting diodes achieves an upper current level, the current sensing element signals activation of the current limitation element, said current limitation element maintains current through the array of light emitting diodes at approximately the upper control limit.

21 Claims, 6 Drawing Sheets

(56) References Cited

U.S. PATENT DOCUMENTS

| | | |
|---|---|---|
| 2008/0106217 A1 | 5/2008 | Schindel et al. |
| 2008/0224634 A1 | 9/2008 | Scilia |
| 2008/0290819 A1 | 11/2008 | Hoepfner et al. |
| 2008/0297067 A1 | 12/2008 | Wang et al. |
| 2009/0115343 A1 | 5/2009 | King |
| 2009/0224686 A1 | 9/2009 | Kunimatsu |
| 2009/0284161 A1 | 11/2009 | Kumar et al. |
| 2009/0295306 A1 | 12/2009 | Sasaki |
| 2009/0322234 A1 | 12/2009 | Chen et al. |
| 2010/0019684 A1 | 1/2010 | Grajcar |
| 2010/0033102 A1 | 2/2010 | Hung et al. |
| 2010/0045187 A1 | 2/2010 | Shteynberg et al. |
| 2010/0079074 A1* | 4/2010 | Godbole ............... 315/127 |
| 2010/0102746 A1* | 4/2010 | Edwards ............... 315/291 |
| 2010/0141160 A1 | 6/2010 | Lee |
| 2010/0188002 A1 | 7/2010 | Hung et al. |
| 2011/0068700 A1 | 3/2011 | Fan |

FOREIGN PATENT DOCUMENTS

| | | |
|---|---|---|
| CN | 101711066 | 5/2010 |
| CN | 101839399 | 9/2010 |
| EP | 1860922 | 11/2007 |
| WO | WO99/56303 | 11/1999 |
| WO | WO01/95673 | 12/2001 |
| WO | WO2006/093870 | 9/2006 |
| WO | WO2008/022270 | 2/2008 |
| WO | WO2009/063984 | 5/2009 |
| WO | WO2010/046065 | 4/2010 |
| WO | WO2010/098174 | 9/2010 |

\* cited by examiner

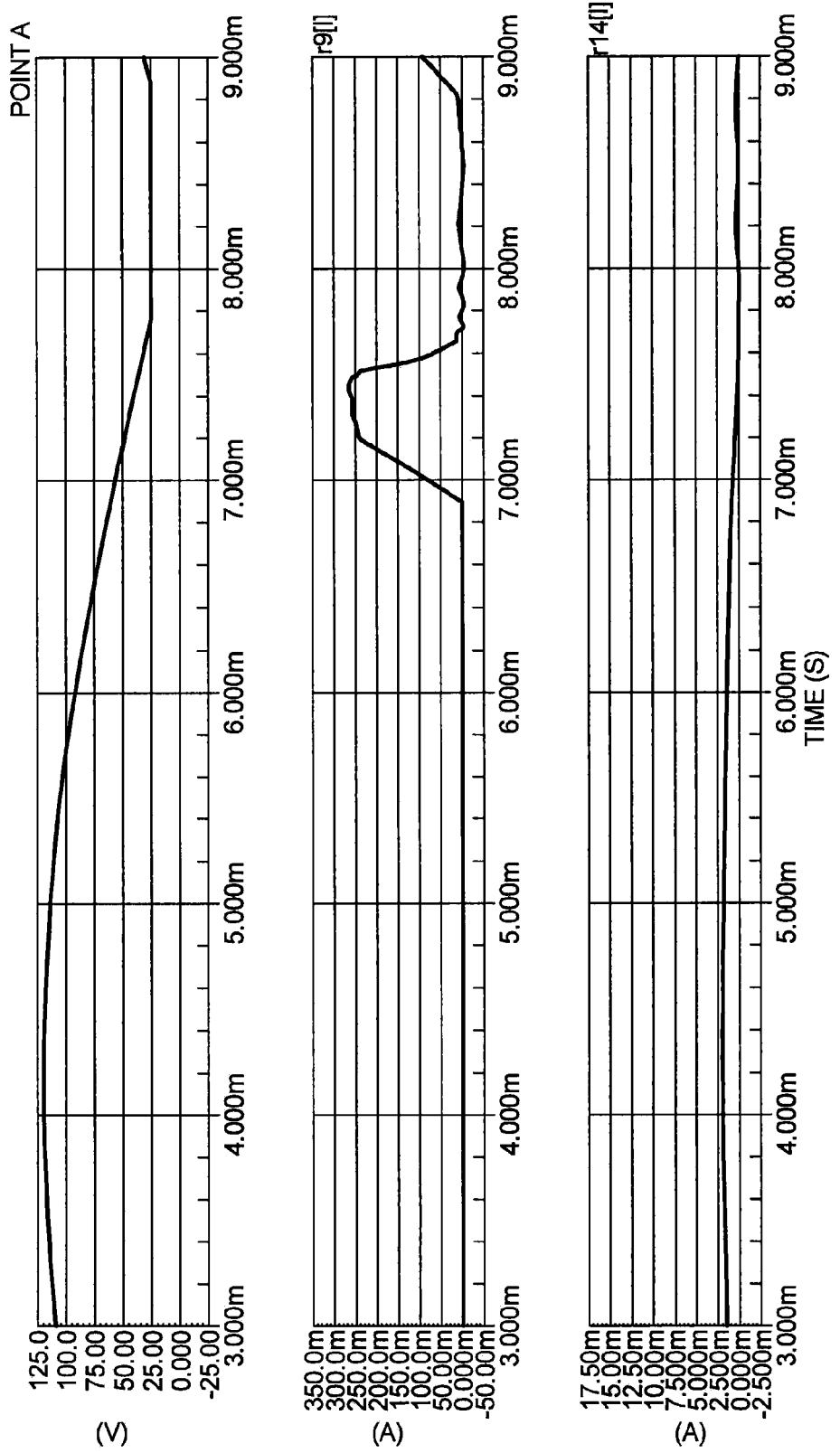

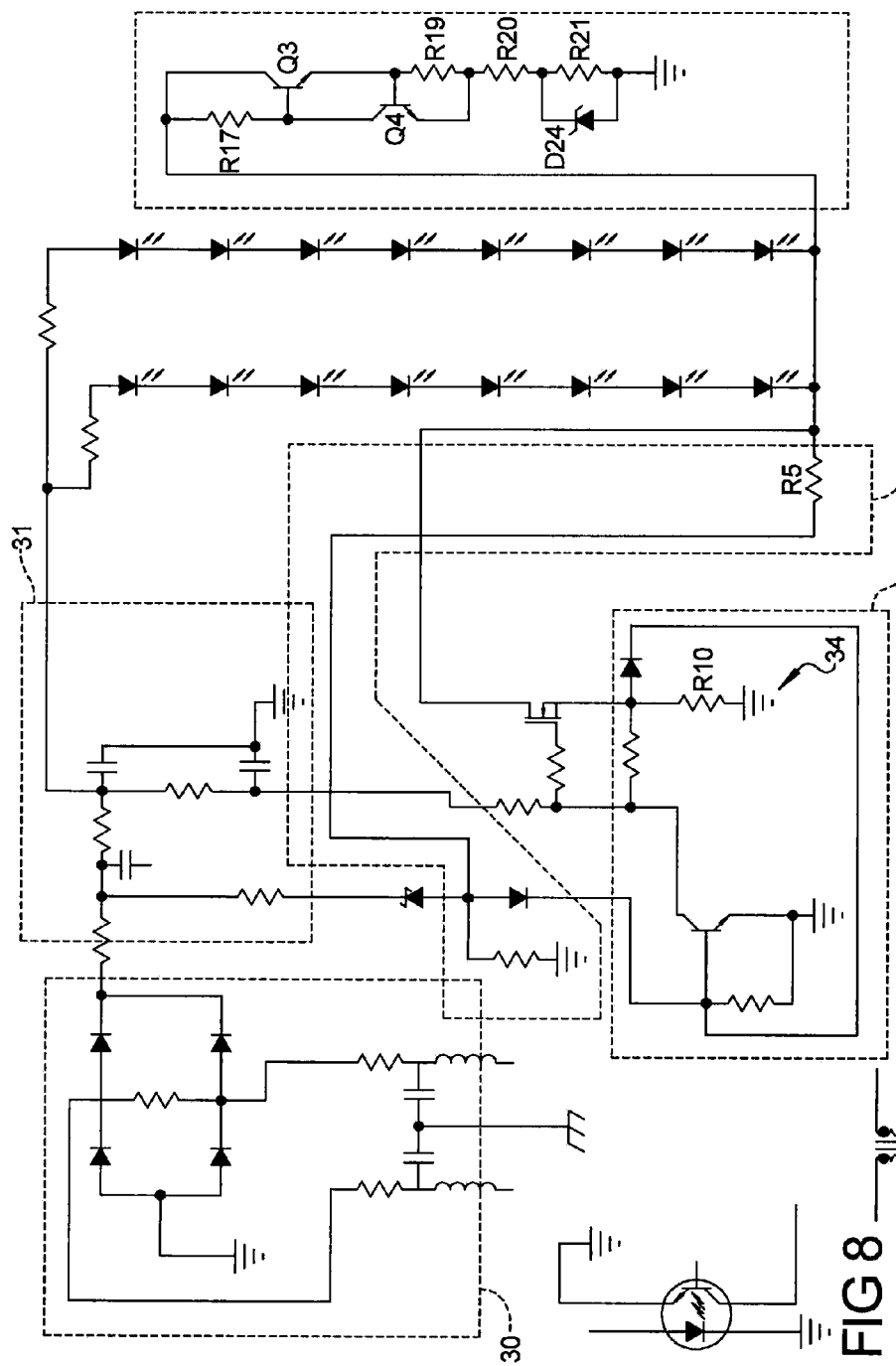

LIGHT EMITTING DIODE DRIVER CIRCUIT

CROSS-REFERENCE TO RELATED APPLICATIONS

This application claims the benefit of U.S. Provisional Application No. 61/498,027, filed on Jun. 17, 2011. The entire disclosure of the above application is incorporated herein by reference.

FIELD

The present disclosure relates to a driver circuit for a light emitting element and, more particularly, to a current limiting diver circuit for an array of light emitting diodes.

SUMMARY

This section provides a general summary of the disclosure, and is not a comprehensive disclosure of its full scope or all of its features.

According to the exemplary embodiments, the present teachings provide a device and method of regulating current flow across an array of emitting diodes (LEDs) for the purpose of illumination. The device has a power supply (vext) connected to an LED array having at least one LED. The LED array is connected to a current foldback element, a current limitation element, a current sensing element, and a current switch. Disposed between power source and the current limitation element is an energy control element.

According to the above description, current passes through circuit formed by the LED array, current limitation element, current sensing element, current foldback element, and the energy control element. In the exemplary embodiment, the current sensing element is a combination of a resistor and diode. As current passes through the current sensing element, it produces an output signal indicative of the amount of current passing through the LED array. In the exemplary embodiment, this output signal corresponds to the voltage produced in the resistor.

According to another embodiment, current passing through the LED array approaches an upper current level (UCL), which UCL is based on the specific manufacturer's specifications particular to the specific type of LED, and correlates with the level of current required to attain maximum illumination of the specific LED. As current through the LED array reaches UCL, the output signal of the current sensing element activates the current limitation element, thereby initiating current limitation and maintaining current through the LED array at approximately UCL despite increasing vext.

In an exemplary embodiment, the current limitation element has a transistor, a resistor network, a gate and a current sensing element in connection. The base of the transistor receives the output signal of the current sensing element. As current through the LED array achieves UCL, the output signal of the current sensing element causes the transistor to begin operating as an amplifier, whereby a portion of current flow is diverted through the transistor to ground, and thereby limiting the current flow through the LED array to approximately UCL.

According to the above description, as vext rises and achieves an upper voltage limit (UVL), the energy control element is activated, causing the current switch to turn "off," preventing current from flowing through the current switch to the LED array. In the exemplary embodiment, the energy control element has a zener diode connected to a transistor, the zener diode only able to conduct when vext rises above UVL. Further, in the exemplary embodiment, the current switch has a transistor, a resistor network and a gate.

According to another embodiment, as vext reaches UVL, the zener diode begins conducting, allowing sufficient current to pass to the base of the transistor. Accordingly, the transistor achieves voltage saturation, turning the transistor into "on" mode. When in "on" mode, the transistor channels current through to ground, and preventing current from passing through to gate, turning the gate into "off" mode. In "off" mode, the gate prohibits current from passing through the current switch into the LED array.

According to the present teachings, when the current switch is in "off" mode, the electrical path causes current to flow through the LED array and directly through the current foldback element through to ground. In the exemplary embodiment, the current foldback element is connected in series to the LED array. Furthermore, in an exemplary embodiment, the current foldback element is a resistor. The current foldback element ensures that as vext increases with time, the current through the LED array never surpasses a lower current limit (LCL).

The operation of the teachings, as described above, repeats as vext begins to descend from peak amplitude over the course of the period, specifically, as vext drops below UVL, the current switch returns to "off" mode and the current limitation element reactivates to maintain current through the LED array at approximately UCL. As vext drops below a level sufficient to maintain operation of the current limitation element, the current limitation element deactivates. As the period of vext reaches completion, the entire cycle begins again.

The magnitude of UCL and duration of the current limitation period, the magnitude of UVL, magnitude of LCL and duration of the current foldback period, and the corresponding frequency of current limitation period and current foldback period is configured based on the specific characteristics of the LED array to optimize heat dissipation in the LED array and luminosity. Specifically, current limitation and current foldback is optimized in order to achieve a frequency of illumination and delumination of the LED array sufficient to maximize heat dissipation in the LED array while still maintaining a constant perception of maximum illumination.

According to the teachings of one embodiment, a system for regulating power to an array of light emitting diodes, is provided. The system has a power supply, supplying a supply voltage, coupled to the array of light emitting diodes. Coupled to the power supply is a current switch, which is in turn coupled to a current limitation element. A current foldback element coupled to the array of diodes. A current sensing element is operably connected to the array of light emitting diodes, and capable of producing a signal indicative of the current through the array of light emitting diodes, and operably connected to the current limitation element. An energy controller is provided, operably connected to the current switch and configured to sense the supply voltage. When the supply voltage reaches an upper voltage limit, the energy control element produces a signal which deactivates the current switch. The cycle of activation and deactivation current limitation and current foldback repeats across the period of the supply voltage, and the duration of current limitation and current foldback, and values of upper voltage limit, upper control limit and lower control limit are optimized to maximize heat dissipation within the array of light emitting diodes while maintaining a perception of maximum illumination.

According to the present teachings, a system for regulating power to an array of light emitting diodes is provided. The system has a power supply, supplying a non-constant supply voltage, said power supply being coupled to the array of light emitting diodes. A current switch is coupled to the power supply and a current limitation element. A current foldback element coupled to the array of diodes. A current sensing element, operably connected to the array of light emitting diodes operably connected to the current limitation element. An energy controller, operably connected to the current switch and configured to sense the supply voltage, wherein when the supply voltage reaches an upper voltage limit, the energy control element produces a signal which deactivates the current switch, thus limiting the amount of current through the light emitting diodes. The cycle of activation and deactivation current limitation and current foldback repeats across a period of the supply voltage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a set of timing diagrams further illustrating the process of the present teachings, according to the exemplary embodiment illustrated in FIG. 3;

FIG. 7 illustrates a circuit diagram demonstrating a particular exemplary embodiment of the present teachings; and FIGS. 8 and 9 represent alternate current sensing elements according to the present teachings.

Corresponding reference numerals indicate corresponding parts throughout the several views of the drawings.

DETAILED DESCRIPTION

Example embodiments will now be described more fully with reference to the accompanying drawings.

Figure 1:
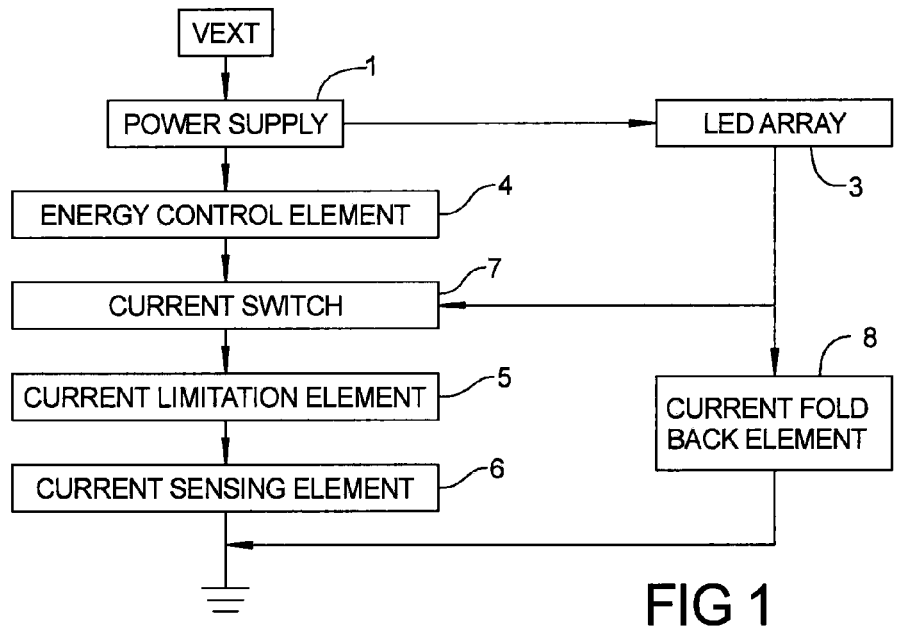
FIG. 1 illustrates a block diagram of an illustrative embodiment according to the present teachings.

FIG. 1 illustrates a block diagram representation of a device and method for regulating current flow through an LED array 3 for the purpose of illumination. The system has a power supply 1, an LED array 3, an energy control element 4, a current limitation element 5, a current switch 7, a current sensing element 6 and a current foldback element 8.

Figure 2:
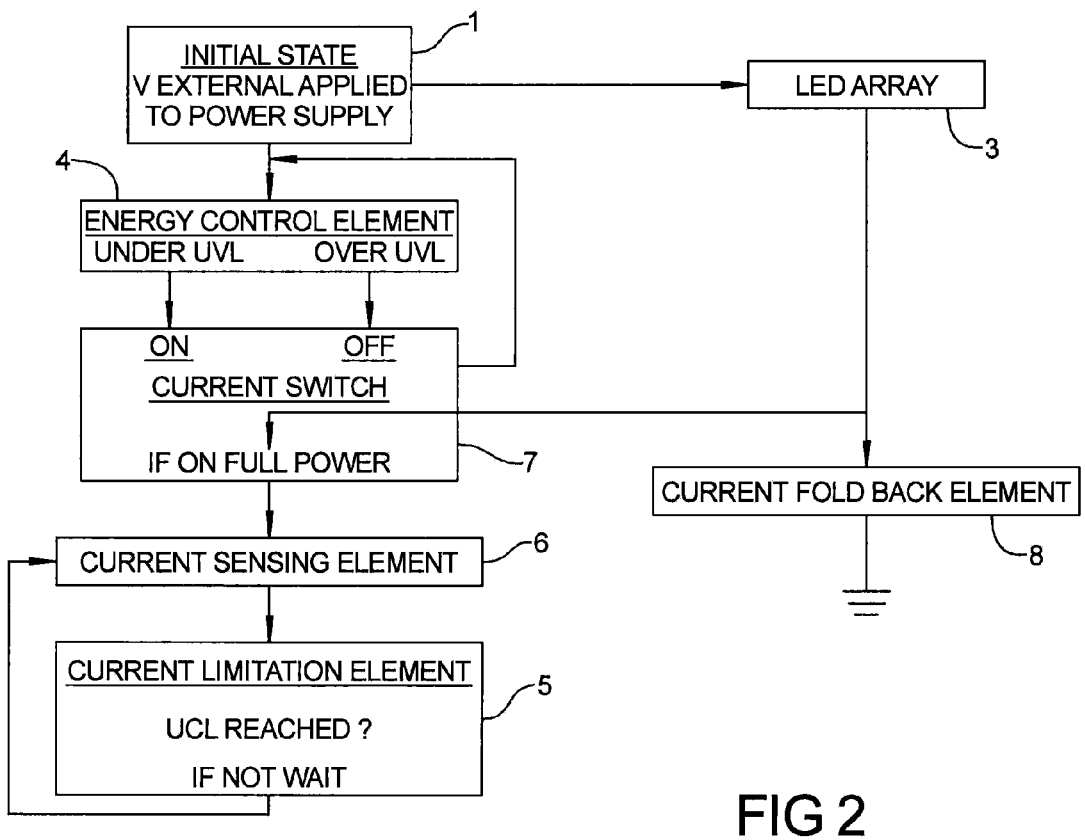
FIG. 2 is a flowchart illustrating the process of the present teachings, according to an exemplary embodiment of the present teachings.

With reference to FIG. 1, power from vext passes through circuit formed by the LED array 3, current limitation element 5, current foldback element 8, and the energy control element. FIG. 2 illustrates the method and functioning of the exemplary embodiment of the current teachings. As current passing through the LED array 3 reaches UCL, which UCL is based on the specific manufacturer's specifications particular to the specific type of LED, and correlates with the level of current required to attain maximum illumination of the specific LED, the output signal of the current sensing element 6 activates the current limitation element 5. Once activated, the current limitation element 5 initiates current limitation, thereby maintaining current through the LED array 3 at approximately UCL despite the increasing vext.

With further reference to FIG. 2, while vext remains below UVL, the energy control element 4 remains deactivated, thereby permitting the current switch 7 to remain "on." In "on" mode, the current switch 7 permits current to pass from vext through the current switch 7 and through to the LED array 3. As vext reaches UVL, the energy control element 4 is activated, thereby causing the current switch 7 to turn "off," preventing current from flowing through the current switch 7 through to the LED array.

When current switch 7 is "off," current cannot flow through the current switch 7 and, as such, all current flowing through the LED array 3 flows directly through the current foldback element 8 to ground. The current foldback element 8 initiates current foldback, which ensures that as vext increases with time, the current through the LED array 3 never surpasses LCL.

The above-referenced cycle repeats as vext descends from peak amplitude over the course of the period. Specifically, as vext drops below UVL, the current switch 7 returns to "on" mode and the current limitation element reactivates to maintain current through the LED array at approximately UCL. As vext drops below a level sufficient to maintain operation of the current limitation element 5, the current limitation element 5 deactivates. As the period of vext reaches completion, the entire cycle begins again.

The magnitude of UCL and duration of the current limitation period, the magnitude of UVL, magnitude of LCL and duration of the current foldback period, and the corresponding frequency of current limitation period and current foldback period is configured based on the specific characteristics of the LED array to optimize heat dissipation in the LED array and luminosity. Specifically, current limitation and current foldback is optimized in order to achieve a frequency of illumination and delumination of the LED array sufficient to maximize heat dissipation in the LED array while still maintaining a constant perception of maximum illumination.

As discussed in greater detail below, the present teachings can operate equally with either NC or D/C power supply, and the illustrated exemplary embodiments are not intended to limit the scope of the teachings. In particular, FIG. 3 is provided to illustrate a specific exemplary embodiment of the device 100.

Figure 3:
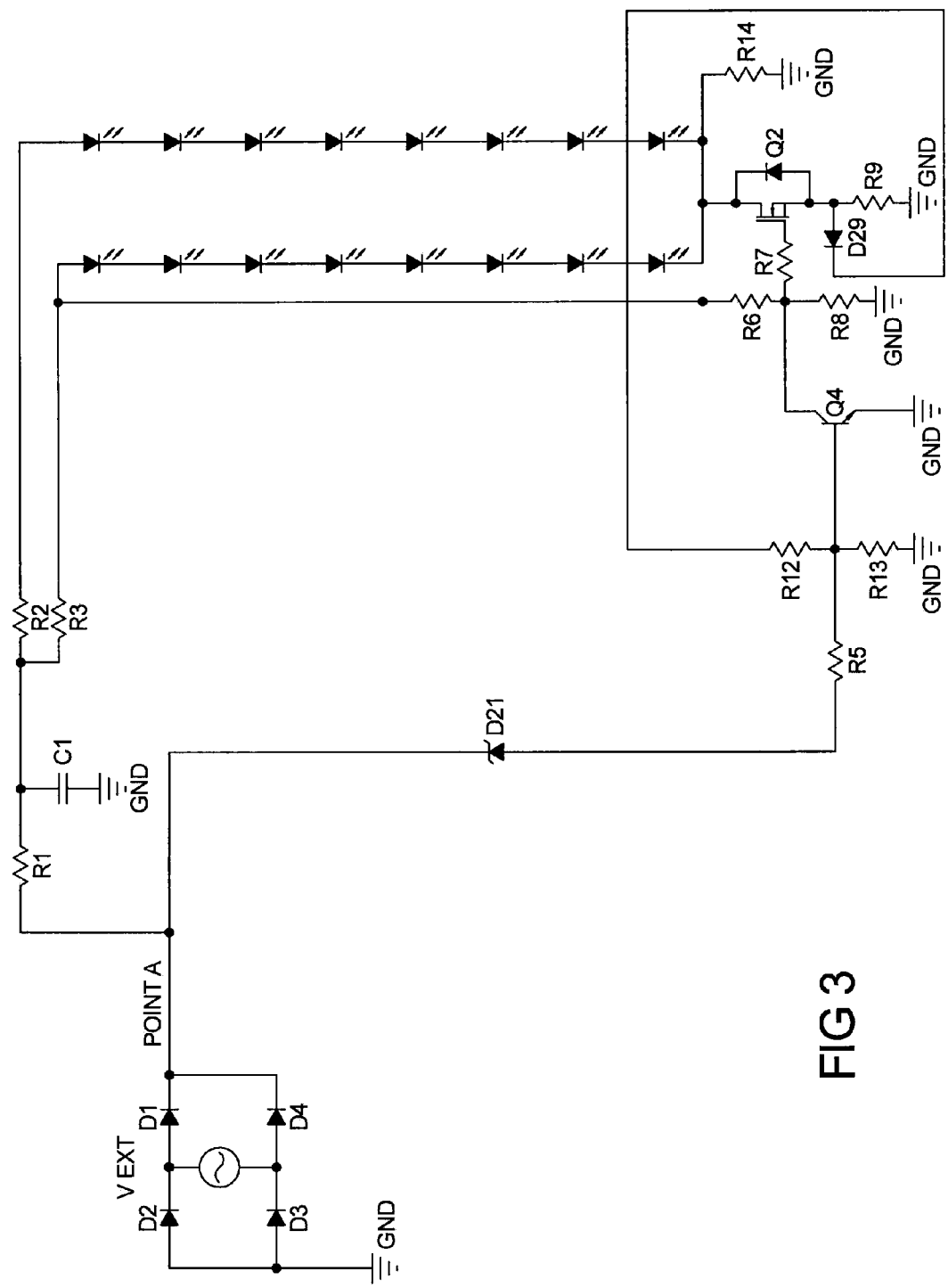
FIG. 3 illustrates a circuit diagram demonstrating a particular exemplary embodiment of the present teachings.

With reference to FIG. 3, power supply 1 can be a standard NC power supply. In the exemplary embodiment illustrated in FIG. 3, power supply 1 is a standard 110V A/C power supply. Diodes D1, D2, D3, and D4 act as a bridge rectifier, in order to convert A/C power supply 1 to positive pulses only, regardless of the cycle. Such bridge rectifiers are well known in the art, and one skilled in the art would readily appreciate that a variety of different rectifiers could be used depending on the specific characteristics of the LED array 3, power supply 1, etc.

Power leaves the diodes D1, D2, D3 and D4 following rectification, and along electric path B1 can enter the delay element 2. With reference to the exemplary embodiment of FIG. 3, the delay element can be formed of resistor R3 and capacitor C1 connected in series. The delay element 2 provides sufficient delay to permit the energy control element 4 to sense vext. Energy control element 4 measures vext in order to ensure voltage passing through the LED array does not exceed the UVL, which UVL is dependent upon the particular LED array in use. The delay element 2 causes a delay in power output along electric path B1 towards the LED array 3 for a time=t, where t can be configured depending on the specific embodiment of the teachings (i.e., the specific type of LEDs used in the LED array) by altering the specific values for R1 and C1, or implementing any sufficient delay element known in the art which is sufficient to achieve this purpose.

Power leaving power supply 1 along electrical path B2 encounters the energy control element 4. In the exemplary embodiment illustrated in FIG. 3, energy control element 4 has zener diode D21, resistor R5, resistor R13 and transistor Q4. Zener diode D21 is configured to establish a voltage limitation equal to UVL, which corresponds with the maximum manufacturer's voltage capacity of the specific LED array 3 used or acceptable function thereof to allow for engineering tolerance. When vext at Point A passing through the zener diode D21 achieves UVL, zener diode D21 begins conducting current to the base of transistor Q4. The zener diode 21 is connected in series with resistor R5, which limits the current passing to transistor Q4, in order to prevent damage to the transistor. Resistor R13 is configured in order to compensate for manufacturing variances in different transistors. It would be readily appreciated by one skilled in the art that the value of resistors R5 and R13 should be altered depending on the specific requirements of the particular embodiment of the teachings, including the type of transistor or LED array used.

Interposed between the energy control element 4 and LED array 3 is current limitation element 5. Referring to the exemplary embodiment illustrated in FIG. 3, the current limitation element 5 is comprised of resistor R12, transistor Q4, the resistor network R6, R7 and R8, gate Q2. Further, connected to the current limitation element 5 is the current sensing element 6. In the exemplified embodiment, the current sensing element 6 is resistor R9.

With reference to FIG. 3, current passing through electrical path B1 passes along an electrical path parallel to the LED array 3, through the resistor network comprising R6, R7 and R8, gate Q2, the current sensing element 6 and the LED array 3. This electrical path provides current to gate Q2 in order to turn gate Q2 "on," thereby allowing gate Q2 to begin conducting current. Again, with reference to FIG. 3, the current sensing element 6 produces an output signal indicative of the current passing through LED array 3, gate Q2 and correspondingly through current sensing element 6. In the exemplary embodiment, the output signal passes to the base of transistor Q4.

As current through the LED array 3, and respectively the current sensing element 6 reaches UCL, which corresponds with the current level specific to the particular LEDs used in LED array 3 for achieving maximum illumination, the corresponding output signal from the current sensing element 6 to the base of transistor Q4 causes the transistor to begin regulation and limitation of current through the LED array 3. Current limitation is achieved by transistor Q4, which upon receiving the output signal correlating to UCL begins channelling a portion of electrical current through to electrical ground. Accordingly, this process limits the current through LED array 3 to UCL despite the increasing vext.

With reference to the embodiment of FIG. 3, when sufficient voltage with respect to ground approaches gate Q2 along the electrical path parallel to LED array 3, gate Q2 is turned "on" and begins conducting current. Current passing through gate Q2, and the current sensing element 6, passes to the base of transistor Q4, causing Q4 to begin acting as an amplifier. When amplifying, transistor Q4 diverting a portion of current through transistor Q4 to ground, thereby limiting the amount of current passing through to gate Q2 and through to LED array 3. During current limitation, the activity of transistor Q4 sustains the level of current through LED array 3 at approximately UCL.

In the exemplary embodiment illustrated in FIG. 3, transistor Q4 performs several functions. Transistor Q4 is component both of current limitation element 5 (as described above) as well as the current switch 7, which has transistor Q4, resistor network R6, R7 and R8, and gate Q2. With respect to current switch 7, when vext remains below UVL, the energy control element 4 causes the current switch 7 to remain "on," thereby permitting current to continue flowing through current switch 7, through to LED array 3. With reference to the exemplary embodiment illustrated in FIG. 3, when zener diode 21 is not conducting (i.e., vext remains below UVL), transistor Q4 continues permitting current to pass from transistor Q4 through gate Q2 and through to the LED array 3.

When vext exceeds UVL, energy control element 4 signals current switch 7 to deactivate, thereby preventing current from flowing through the current switch 7 through to the LED array 3. Again, with reference to the exemplary embodiment in FIG. 3, when zener diode D21 is conducting (i.e., vext has escalated above UVL), current passes along an electrical path through to the base of transistor Q4, thereby causing transistor Q4 to enter into "on" mode (i.e., the transistor has achieved voltage saturation). At this point, in "on" mode, transistor Q4 causes all current that would have passed through current switch 7 through to the LED array 3 while current switch 7 was on to pass through to ground.

As current is prevented from passing through to the base of gate Q2 (i.e., gate Q2 no longer receives power), gate Q2 is shut "off" and is no longer able to conduct. Furthermore, one-way zener diode D29 prevents any current feedback from transistor Q4 from re-entering gate Q2.

While current switch 7 is in "off" mode, and gate Q2 is not conducting, power passing through LED array 3 is channeled directly through current foldback element 8 through to ground. In the exemplified embodiment, current foldback element 8 is connected in series to LED array 3. Current foldback element 8 is configured to ensure that current through LED array 3 never surpasses LCL despite increasing vext (i.e., LCL is achieved when vext reaches its peak). The value of LCL (and corresponding characteristics of current foldback element 8) is chosen based on the specific characteristics and requirements of the LED array used, in order to optimize illumination and maximize heat dissipation (as further elaborated below).

As the cycle of vext causes current at Point A to remain below UCL, both current limitation and current foldback remain inactive. As vext at Point A causes current at Point A to elevate above UCL, current limitation activates to maintain current through LED array 3 at UCL. As vext elevates above VCL, the energy control element 4 deactivates current switch 7, thereby activating current foldback and causing current in LED array 3 to remain below LCL. While vext increases from 0 to UCL, current through LED array 3 causes the LEDs to illuminate. This illumination continues during the current limitation period. However, as current foldback is activated, and current through LED array 3 sharply declines, illumination of LED array 3 also decreases. Concurrently, during current foldback, as current through LED array 3 is sharply reduced (and concurrently illumination is reduced), LED array 3 dissipates heat.

Accordingly, the above described cycle of illumination increase and decrease causes a corresponding increase and decrease in heat in LED array 3. The frequency of current limitation and current foldback is adjusted for the specific characteristics of the LED array in use in device 100 in order to optimize illumination and heat dissipation. Specifically, the magnitude of UCL and UVL, the magnitude of LCL, and corresponding duration/frequency of current limitation and current foldback is adjusted in order to optimize illumination and heat dissipation such that LED array 3 provides a continuous perception of maximum luminosity while maximizing heat dissipation.

Principles of operation of at least one exemplary embodiment of the device 100 and method of operation are described below, with reference to and in connection with FIGS. 3-7. The exemplary embodiment described below is for illustration purposes only and is not meant to limit the present teachings to any particular embodiment illustrated herein. It is well within the purview of one skilled in the art that various modifications, changes and alterations to the illustrated embodiments may be made without departing from the scope of the present teachings.

In the particular embodiment illustrated in FIG. 3, LED array 3 is comprised of two strings of eight LEDs, the strings being in parallel connection. These are typical white LEDs which are common in the art regularly available, such as Phillips or any other similar manufacturer. In this particular embodiment, each LED has an approximate maximum voltage rating of 3.6V and LED array 3 has a maximum current rating of approximately 250 milliamps (as the strings exemplified in this embodiment are in parallel, it is actually 125 milliamps per LED), and accordingly, each LED string has a maximum voltage rating of approximately 28.8V.

Optionally, zener diode D21 can have a rating to 51V. Power source 1 is connected to a vext being a standard 110V A/C connection. From time t=0 to approximately time t=400 microseconds, at which point V=approximately 51V, zener diode D21 does not conduct. Accordingly, energy control element 4 remains inactive.

In this exemplary embodiment, gate Q2 is a MOSFET, requiring an approximate 10V input to activate. As vext reaches 10V, the electrical path running parallel to LED array 3 provides the necessary voltage input to activate gate Q2, thereby permitting gate Q2 to begin conducting. Concurrently, current switch 7 turns "on," as current is now able to pass through current switch to LED array 3.

Referring to FIG. 3, as current switch 7 is activated, and gate Q2 begins conducting, current simultaneously passes through LED array 3, current foldback element 8, and the current sensing element 6, thereby causing LED array 3 to gradually illuminate. In this particular embodiment, the current foldback element is has of resistor R14, which in the exemplary embodiment has a value of 47 KOhm.

As gate Q2 is in the "on" mode, it allows current to flow through to LED array 3, thereby causing illumination. Current also flows through the current sensing element 6, which in the exemplified embodiment is comprised of resistor R9 and diode D29. Current through LED array 3 rises as vext rises. Correspondingly, current through the current sensing element 6, and specifically resistor R9, also increases. Diode D29 begins conducting the volume of current passing through resistor R9, channelling this volume to base of transistor Q4, which in turn begins conducting current flow from collector to ammeter, thereby restricting current flow through gate Q2. Resistor R9 is configured to produce a signal which is indicative of the current flowing through LED array 3. This signal corresponds with the voltage produced across resistor R9 caused by the current passing through the LED array 3.

Referring to FIG. 3, as vext at the point of reference (i.e., Point A) has risen to approximately 28V, sufficient current will flow through LED array 3 and gate Q2 and resistor R9 to cause LED array to reach full illumination. In the exemplary embodiment, at this point in time, LED array 3 will reach approximate maximum illumination. Furthermore, it is at this point that current sensing element 6 causes current limitation element 5 to activate and begin current limitation. It is at this point that transistor Q4 begins to act as an amplifier, channeling a portion of current through to ground and thereby limiting the current passing through gate Q2 through to LED array 3. As current through LED array 3 is maintained, likewise illumination of LED array 2 is also maintained. Vext continues rising through resistor R9, and diode D29, and resistor R12 through to the base of transistor Q4. However, transistor Q4 regulates sufficient flow of current through gate Q2 through to LED array 3 despite increasing vext.

As vext at reference Point A reaches UVL, energy control element 4 activates, thereby deactivating current switch 7. In the exemplary embodiment illustrated in FIG. 2, UVL is equal to 51V. At this point, zener diode D21 is configured to begin conducting and providing sufficient voltage to the base of transistor Q4 in order to turn transistor Q4 "on" (i.e., transistor Q4 has achieved voltage saturation). When transistor Q4 is on, transistor Q4 begins to channel current that would have, while current switch 7 was "on," passed through current switch 7 through to LED array 3 to ground. Specifically, transistor Q4 prevents current from reaching the base of gate Q2, thereby shutting gate Q2 "off" and preventing gate Q2 from conducting.

With reference to FIG. 3, diode D29 acts as a one-way diode, further preventing any feedback current from transistor Q4 to enter resistor R9 and from reverse biasing gate Q2. Therefore, when energy control element 4 is activated, current limitation element 5 is deactivated.

When energy control element 4 deactivates current switch 7 and current limitation element 5, current through LED array 3 is channeled through current foldback element 8 through to ground. With reference to FIG. 3, when gate Q2 is "off," all current through LED array 3 is channeled through to resistor R14. Resistor R14 serves to ensure that as vext continues rising, current through LED array is limited and does not surpass LCL. In the exemplary embodiment, as vext through reference Point A approaches the maximum 110V, the current through the LED array is maintained at approximately the minimum threshold required to maintain illumination. In this particular embodiment, resistor R14 has a value of 47 KOhms, therefore as vext reaches a peak of 110V, LCL reaches a peak of 2 milliamps.

Figure 4:
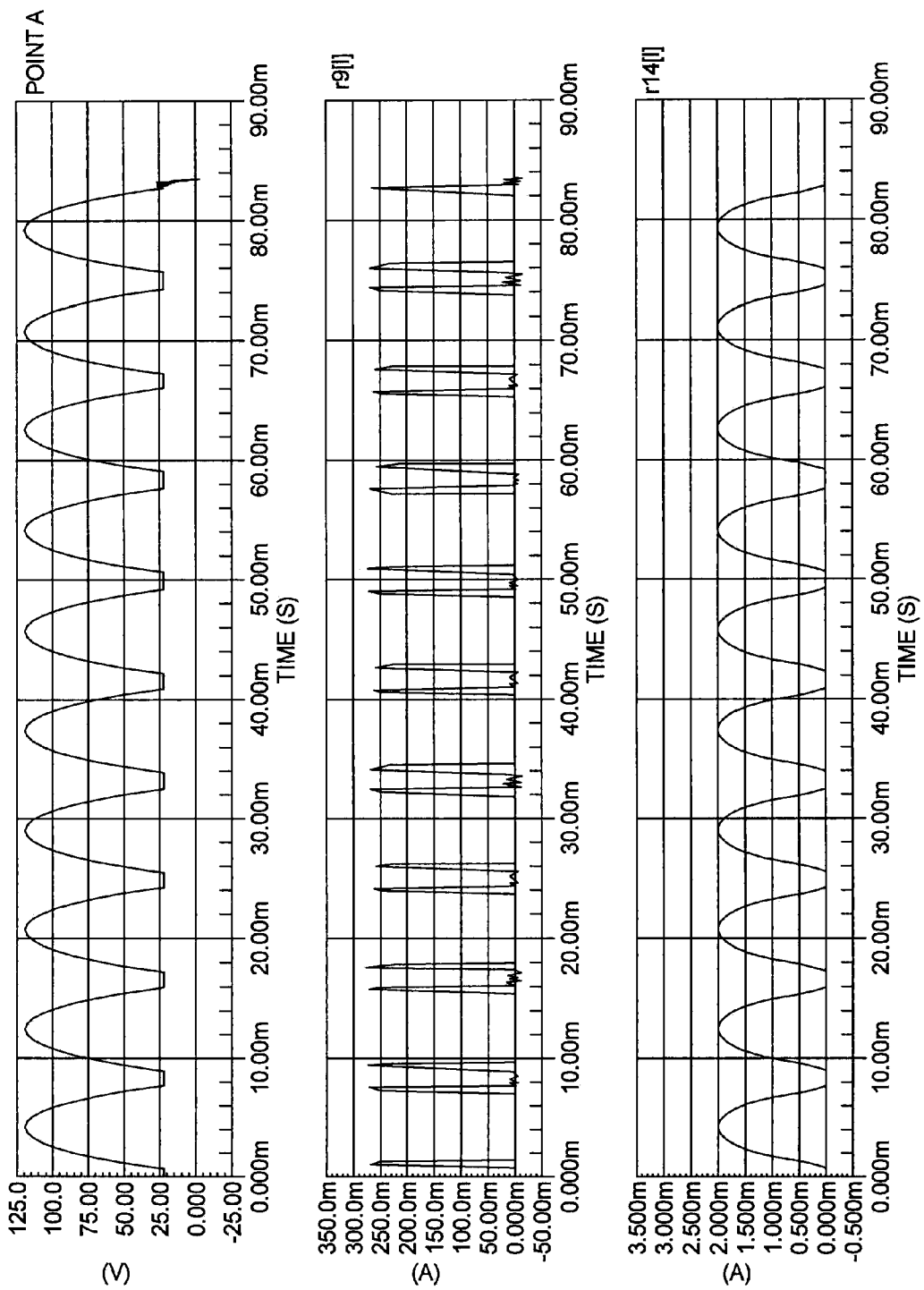
FIG. 4 is a set of timing diagrams illustrating the process of the present teachings, according to the exemplary embodiment illustrated in FIG. 3.
Figure 5:
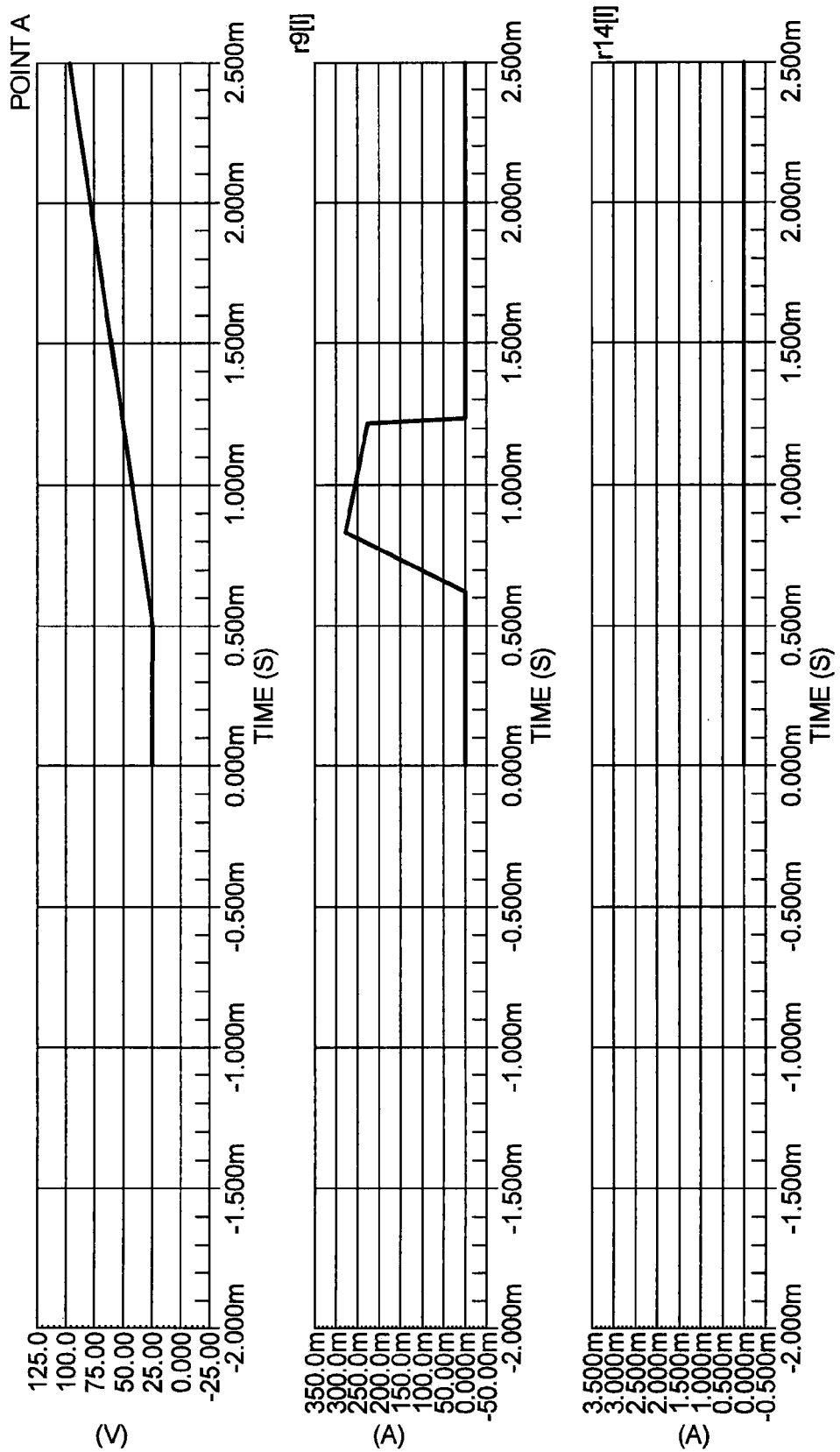
FIG. 5 is a set of timing diagrams further illustrating the process of the present teachings, according to the exemplary embodiment illustrated in FIG. 3.

FIGS. 4-6 show time vs. voltage/current charts illustrating the functioning of the teachings as demonstrated in the exemplary embodiment of FIG. 3. As seen in FIG. 4, as vext at reference Point A increases with time, current passing through LED array 3 increases towards UCL. In this particular embodiment, as seen in FIG. 4b, UCL is equal to approximately 250 milliamps. FIG. 5 illustrates the time chart of FIG. 4, except limited from time t=0 to t=2.5 microseconds. Referring to FIGS. 5a and 5b, when current through LED array 3 reaches UCL, current limitation element 5 begins to regulate current through LED array 3, maintaining current at approximately 250 milliamps despite continuing increase in vext. As seen in FIGS. 5a and 5b for this particular embodiment, it is when vext at reference Point A and correspondingly through LED array 3 reaches approximately 28.8V, current limitation element 5 begins to regulate and maintain current through LED array 3 at approximately 250 milliamps. Accordingly, this also maintains maximum luminosity as LED array 3 maintains UCL.

As further seen in FIGS. 4 and 5, as vext through reference Point A reaches 51V, energy control element 4 activates, thereby deactivating current switch 7 and current limitation element 5. Specifically, at approximately time t=1.2 microseconds, when vext reaches 51V, zener diode D21 begins conducting, thereby causing transistor Q4 to turn "on" and gate Q2 to turn "off." At this point, all current passing through LED array 3 passes through to current foldback element 8. As seen in FIG. 5b, at this point, no current passes through resistor R9, and simultaneously current limitation element 5 is deactivated.

With reference to FIGS. 4a and 4c, as vext continues to rise following the initiation of current foldback, current through resistor R14 (as seen in FIG. 4c) and correspondingly through LED array 3 is minimized by the functioning of current foldback element 8. As seen in FIGS. 4a and 4c, at approximately time t=4 microseconds, vext reaches its peak of 110 v, and correspondingly, current foldback element 8 limits the current through LED array 3 to LCL, which in the exemplary embodiment is equal to 2 milliamps.

The above referenced cycle achieves two concurrent functions. As voltage and current ramp up toward the UCL, current limitation element 5 maintains current through LED array 3 at UCL, thereby illiciting and optimizing the maximum illumination to be achieved from LED array 3. However, as maximum illumination is maintained, the individual LEDs of LED array 3 begin to rise in temperature, which has numerous undesirable side effects including the extreme possibility of LED failure. LED technology known in the art overcomes this by implementing various forms of heat control apparatuses.

However, once energy control element 4 takes effect, thereby initiating current foldback (as seen in FIGS. 4b and 4c), current through LED array 3 drops, thereby causing illumination and corresponding heat through the LEDs to decrease. Current foldback element 8 maintains a minimum threshold current through the LED array, sufficient to maximize illuminosity while minimizing heat over the course of each cycle.

With reference to FIGS. 4a and 4b, in conjunction with FIG. 6, this cycle repeats across the voltage cycle. Specifically, FIG. 6 shows that at approximately time t=7.1 microseconds, as vext descends from peak and descends below 51V, energy control element 4 deactivates, thereby reactivating current switch 7 and current limitation element 5. As seen in FIG. 6b, at this point current through LED array 3 is again maintained at approximately UCL (i.e., 250 milliamps). Finally, when voltage at base of gate Q2 drops below a specified level (in the exemplary embodiment, this level being 10V), gate Q2 turns "off" and current limitation element again deactivates. FIGS. 4a and 4b demonstrate that this cycle continuously repeats with the cycle of vext.

Therefore, one skilled in the art would be able to optimize illuminosity versus heat dissipation, depending on the particular characteristics of the specific LED array in question, by varying the characteristics of the cycle of current limitation and current foldback. For example, one skilled in the art may choose to vary the value of zener diode D21, or resistor R14 depending on the specific requirements of the LED array in use. Furthermore, the UCL may be increased, while shortening the period of current limitation and increasing the value LCL. Depending on the characteristics of the LED array chosen, one skilled in the art would readily appreciate that the cycle of limitation and foldback would require adjustment in order to maximize illumination while still achieving sufficient heat dissipation to ensure that the individual LEDs do not overheat.

Furthermore, one skilled in the art can readily appreciate that various component exemplified in the illustrated embodiments can be modified replaced without departing from the scope of the present teachings. For example, the number of LEDs in LED array 3 can be varied, and various strings of LEDs may be connected in parallel or series. Furthermore, various resistors, such as resistors R5 and R12 can be modified depending on the type of transistor Q4 implemented in various embodiments. Resistors R2 and R3 are used to provide current protection for the specific LEDs used in LED array 3, and values for such resistors can be modified depending on the specific characteristics of LED array 3 (or may be removed all together in some embodiments). Similarly, resistor network R6, R7 and R8 are configured based on the specific characteristics of gate Q2, and as such, one skilled in the art would be able to modify the characteristics of this specific resistor network depending on the characteristics of gate Q2. The present teachings can be used equally with a DC power source, by simply connecting a converter, in order to convert the DC power to the required AC.

FIGS. 7-9 illustrate alternate embodiments of the teaching exemplified in FIG. 3. Shown is a power supply 30, delay element 31, self-adjusting current limitation 32, and current limiting element 33. Within the current limiting element, is a current sensing element 34. While FIG. 7 illustrates a circuit diagram demonstrating a particular exemplary embodiment of the present teachings, FIGS. 8 and 9 represent alternate current sensing elements according to the present teachings Similar to the embodiment of FIG. 3, with reference to FIG. 7, power input passes through diodes D1-D4, which act as a rectifier, and then through the delay network consisting of R2, R6, R7 and Capacitors C3, C4 and C5. Power passes through branch A towards Energy Control Element which, in the embodiment of FIG. 7, consists of the zener diode D23.

Similar to the embodiment of FIG. 3, resistor R14, diode D5, resistor R16 and resistor R15 are modifications and which are dependent upon the specifications of the particular circuit and specific components embodying the teachings and would be readily apparent to one skilled in the art. For example, resistor R14 functions to limit current accessing zener diode D23, in order to protect zener diode D23 from malfunction. The value of R14 depends on the particular specifications of the type of zener diode used in the circuit. Similar to the embodiment of FIG. 3, the energy control element D23 functions like a 'barrier'—until operating voltage reaches UVL, the energy control element prevents current from passing through.

As time t approaches the point where voltage reaches UVL, energy control element activates. Again, similar to the embodiment of FIG. 3, in FIG. 7, the energy control element constitutes a zener diode, namely, diode D23. For example, the addition of diode D5 is included in order to safeguard zener diode D23 from current along path A, and ensure one-way current conduction. Furthermore, as previously elaborated, resistor R14 functions to limit the current accessing zener diode D23, based on the zener diode D23 specifications. The duration of current limitation and current foldback, and values of upper voltage limit, upper control limit and lower control limit are optimized to maximize heat dissipation within the array of light emitting diodes while maintaining a perception of maximum illumination Upon Vext reaching UVL, the energy control element (i.e. zener diode D23), begins conducting, thereby signaling deactivation of the current switch. This is accomplished when current conducted through the zener diode D23, after Vext achieves UVL, reaches the base of gate Q2. Gate Q2 is configured to begin conducting upon receiving the requisite current conducted through zener diode D23 after achieving UVL. Similar to the embodiment of FIG. 3, this activates the process of current foldback. When current through the array of light emitting diodes achieves an upper current level, the current sensing element signals activation of the current limitation element, said current limitation element maintains current through the array of light emitting diodes at approximately the upper control limit.

The embodiment of FIG. 7 illustrates the addition of branch C, which includes resistor R5. The addition of this resistor functions as a self-adjusting current limiter for the LED array. The inclusion of this resistor acts a 'softener' for the LEDs—the inclusion of resistor R5 provides soft current limitation in order to accommodate for the specific requirements of certain LEDs, based on manufacturing specifications of the LEDs in the array.

Upon Vext achieving UVL, deactivation of the current switch correspondingly activates current foldback. In the embodiment of FIG. 7, the current foldback element of FIG. 3, namely resistor R14, is replaced with a current foldback circuitry comprised of resistors R17, R19, R20 and R21 as well as transistors Q3 and Q4 and zener diode D24. In comparison to current foldback element of FIG. 3, namely resistor R14, the current foldback circuitry illustrated in FIG. 7 is able to provide and maintain a preset value of LCL regardless of the maximum value of Vext. In the embodiment of FIG. 3, the value of resistor R14 may have to be adjusted depending on the maximum value of Vext and the desired value of LCL based on the specification of the LEDs used in LED Array 3. However, in the embodiment of FIG. 7, the illustrated current foldback circuitry can be configured to provide a defined, preset value for LCL regardless of the value of Vext, i.e. the circuitry of the embodiment of FIG. 7 can be used for any value of Vext and still maintain a preset value for LCL. One skilled in the art can readily adjust the values of any of the resistors or transistors, or add resistors or transistors as required in order to configure the circuit of FIG. 7 to achieve the desired value for LCL.

As illustrated in FIG. 7, resistor R10 acts as the current sensing element, which senses current passing through LED Array. However, with reference to FIG. 8, diode D6 can be replaced with an LED opti-coupling, which contains an LED which illuminates with current passing through the LEDs. In turn, an internal opti-transistor reacts by limiting current through Q1. When the supply voltage is below the upper voltage limit, the transistor is off and allows current to pass through the transistor, resistor network and gate through to the array of light emitting diodes.

Furthermore, with reference to FIG. 9, transformer T1 can replace both R10 and D6. Internal induction of transformer T1 can control gain on transistor Q2, which in turn controls current flow through Q1. Furthermore, transformer T1 may also provide a voltage output corresponding to the current through the LED Array 3, thereby achieving the function of a current sensing element. As discussed in detail in reference to the embodiment of FIG. 3, as current through the circuit increases from t=0 towards UCL, upon reaching UCL, currently limitation activates. Setting of the values allows the cycle of activation and deactivation current limitation and current foldback repeats across the period of the supply voltage, and the duration of current limitation and current foldback, and values of upper voltage limit, upper control limit and lower control limit are optimized to maximize heat dissipation within the array of light emitting diodes while maintaining a perception of maximum illumination.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for regulating power to an array of light emitting diodes, the system comprising:
a power supply, supplying a supply voltage, coupled to the array of light emitting diodes;
a current switch coupled to the power supply;
a current limitation element coupled to the current switch;
a current foldback element coupled to the array of diodes;
a current sensing element, operably connected to the array of light emitting diodes, and capable of producing a signal indicative of the current through the array of light emitting diodes, and operably connected to the current limitation element;
an energy controller, operably connected to the current switch and configured to sense the supply voltage, wherein when the supply voltage reaches an upper voltage limit, the energy control element produces a signal which deactivates the current switch;
wherein the cycle of activation and deactivation current limitation and current foldback repeats across the period of the supply voltage, and the duration of current limitation and current foldback, and values of upper voltage limit, upper control limit and lower control limit are optimized to maximize heat dissipation within the array of light emitting diodes while maintaining a perception of maximum illumination.

2. The system of claim 1, wherein when current through the array of light emitting diodes achieves an upper current level, the current sensing element signals activation of the current limitation element, said current limitation element maintains current through the array of light emitting diodes at approximately the upper control limit.

3. The system of claim 2, wherein when the supply voltage is below the upper voltage limit, the transistor is off and allows current to pass through the transistor, resistor network and gate through to the array of light emitting diodes.

4. The system of claim 3, wherein when the supply voltage is above the upper voltage limit, the transistor is on and causes all current to pass through the transistor directly through to ground.

5. The system of claim 1, wherein the current switch activates the current foldback and the current foldback element prevents current passing through the array of light emitting diodes by surpassing a lower current level.

6. The system of claim 1, wherein the current switch comprises a transistor, a resistor network and a gate, connected in series.

7. The system of claim 6, wherein the base of the transistor receives the signal from the energy control element for deactivation of the current switch.

8. The system of claim 1, wherein the supply voltage is non-constant.

9. The system of claim 1 wherein the current sensing element comprises a resistor connected to the array of light emitting diodes, and wherein the signal indicative of the current through the array of light emitting diodes corresponds with the voltage across the resistor.

10. The system of claim 1 wherein the energy control element comprises a zener diode, the zener diode connected in series with the current switch and able to conduct current to the current switch, in order to signal deactivation of the current switch, when the supply voltage exceeds upper voltage limit.

11. A system for regulating power to an array of light emitting diodes, the system comprising:
a power supply, supplying a non-constant supply voltage, said power supply being coupled to the array of light emitting diodes;
a current switch coupled to the power supply;
a current limitation element coupled to the current switch;
a current foldback element coupled to the array of diodes;
a current sensing element, operably connected to the array of light emitting diodes operably connected to the current limitation element;
an energy controller, operably connected to the current switch and configured to sense the supply voltage, wherein when the supply voltage reaches an upper voltage limit, the energy control element produces a signal which deactivates the current switch, thus limiting the amount of current through the light emitting diodes;
wherein the cycle of activation and deactivation current limitation and current foldback repeats across a period of the supply voltage.

12. The system of claim 11, wherein the duration of current limitation and current foldback, and values of upper voltage limit, upper control limit and lower control limit are optimized to maximize heat dissipation within the array of light emitting diodes while maintaining a perception of maximum illumination.

13. The system of claim 11, wherein when current through the array of light emitting diodes achieves an upper current level, the current sensing element signals activation of the current limitation element, said current limitation element maintains current through the array of light emitting diodes at approximately the upper control limit.

14. The system of claim 11, wherein the current switch activates the current foldback and the current foldback element prevents current passing through the array of light emitting diodes by surpassing a lower current level.

15. The system of claim 11, wherein the current switch comprises a transistor, a resistor network and a gate, connected in series.

16. The system of claim 15, wherein the base of the transistor receives the signal from the energy control element for deactivation of the current switch.

17. The system of claim 11, wherein when the supply voltage is below the upper voltage limit, the transistor is off and allows current to pass through the transistor, resistor network and gate through to the array of light emitting diodes.

18. The system of claim 17, wherein when the supply voltage is above the upper voltage limit, the transistor is on and causes all current to pass through the transistor directly through to ground.

19. The system of claim 11, wherein the supply voltage is non-constant.

20. The system of claim 11, wherein the current sensing element comprises a resistor connected to the array of light emitting diodes, and wherein the signal indicative of the current through the array of light emitting diodes corresponds with the voltage across the resistor.

21. The system of claim 11, wherein the energy control element comprises a zener diode, the zener diode connected in series with the current switch and able to conduct current to the current switch, in order to signal deactivation of the current switch, when the supply voltage exceeds upper voltage limit.

* * * * *